United States Patent
Sumiya et al.

(10) Patent No.: US 12,510,653 B2
(45) Date of Patent: Dec. 30, 2025

(54) RADAR APPARATUS, IMAGING METHOD, AND NON-TRANSITORY COMPUTER-READABLE MEDIUM

(71) Applicant: NEC Corporation, Tokyo (JP)

(72) Inventors: Tatsuya Sumiya, Tokyo (JP);
Kazumine Ogura, Tokyo (JP);
Masayuki Ariyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 421 days.

(21) Appl. No.: 18/038,076

(22) PCT Filed: Nov. 27, 2020

(86) PCT No.: PCT/JP2020/044319
§ 371 (c)(1),
(2) Date: May 22, 2023

(87) PCT Pub. No.: WO2022/113294
PCT Pub. Date: Jun. 2, 2022

(65) Prior Publication Data
US 2023/0417901 A1    Dec. 28, 2023

(51) Int. Cl.
*G01S 13/89* (2006.01)
*G01S 13/88* (2006.01)

(52) U.S. Cl.
CPC ............ *G01S 13/89* (2013.01); *G01S 13/887* (2013.01)

(58) Field of Classification Search
None
See application file for complete search history.

(56) References Cited

U.S. PATENT DOCUMENTS

| | | | |
|---|---|---|---|
| 6,212,132 B1 | 4/2001 | Yamane et al. | |
| 7,265,709 B2 * | 9/2007 | Fleisher | G01S 13/887 |
| | | | 342/179 |

(Continued)

FOREIGN PATENT DOCUMENTS

| | | | |
|---|---|---|---|
| JP | 2000-111635 A | 4/2000 | |
| JP | 2017-514109 A | 6/2017 | |

(Continued)

OTHER PUBLICATIONS

International Search Report for PCT Application No. PCT/JP2020/044319, mailed on Jan. 12, 2021.

(Continued)

*Primary Examiner* — Peter M Bythrow

(57) ABSTRACT

A radar signal transmission/reception unit (103) acquires a radar signal generated by using a plurality of transmission antennas Tx and a plurality of reception antennas Rx. A projection direction/imaging policy control unit (107) holds an imaging policy. The imaging policy includes a projection direction representing a direction in which an inspection target is viewed, an imaging area indicating an area of which a three-dimensional radar image is to be generated, and set information being information on a set of pairs of a transmission antenna Tx and a reception antenna Rx for use in generation of the three-dimensional radar image. An imaging unit (104) generates the three-dimensional radar image from the radar signal in accordance with the imaging policy. A projection processing unit (106) forms the three-dimensional radar image into a two-dimensional image by projecting the three-dimensional radar image in the projection direction indicated by the imaging policy.

10 Claims, 19 Drawing Sheets

(56) References Cited

U.S. PATENT DOCUMENTS

| | | | |
|---|---|---|---|
| 9,599,705 B2* | 3/2017 | Wu | G01S 13/89 |
| 10,042,046 B2* | 8/2018 | Liu | G01S 13/003 |
| 2010/0220001 A1* | 9/2010 | Longstaff | H01Q 1/007 |
| | | | 342/201 |
| 2011/0043403 A1* | 2/2011 | Loffler | G01S 13/887 |
| | | | 342/25 A |
| 2013/0030769 A1* | 1/2013 | Asanuma | G01S 13/343 |
| | | | 702/189 |
| 2015/0253422 A1 | 9/2015 | Morton et al. | |
| 2016/0216371 A1 | 7/2016 | Ahmed et al. | |
| 2018/0224538 A1 | 8/2018 | Ahmed et al. | |
| 2018/0224980 A1* | 8/2018 | Avila | G06V 40/28 |
| 2019/0064342 A1* | 2/2019 | Daisy | G01S 13/0209 |
| 2019/0242990 A1 | 8/2019 | Daisy et al. | |
| 2019/0339380 A1* | 11/2019 | Marks | G01S 13/887 |
| 2020/0158860 A1* | 5/2020 | Morton | G01V 3/12 |
| 2020/0320731 A1* | 10/2020 | Sheen | G06F 3/04815 |
| 2021/0018608 A1* | 1/2021 | Charpentier | G06T 19/00 |
| 2021/0149034 A1* | 5/2021 | Yamanouchi | G01S 13/04 |
| 2021/0239829 A1 | 8/2021 | Ogura et al. | |

FOREIGN PATENT DOCUMENTS

| | | |
|---|---|---|
| JP | 2018-146257 A | 9/2018 |
| JP | 2019-020212 A | 2/2019 |
| WO | 2019/234852 A1 | 12/2019 |

OTHER PUBLICATIONS

Leonardo Carrer et al., "Concealed Weapon Detection Using UWB 3-D Radar Imaging and Automatic Target Recognition", The 8th European Conference on Antennas and Propagation (EuCAP 2014), The Hague, 2014, pp. 2786-2790, <DOI:10.1109/EuCAP.2014.6902403>.

Sherif Sayed Ahmed et al., "Advanced Microwave Imaging", in IEEE Microwave Magazine, vol. 13, No. 6, pp. 26-43, Sep. to Oct. 2012, <DOI:10.1109/MMM.2012.2205772>.

Xiaodong Zhuge et al., "Three-Dimensional Near-Field MIMO Array Imaging Using Range Migration Techniques", in IEEE Transactions on Image Processing, vol. 21, No. 6, pp. 3026-3033, Jun. 2012, <DOI:10.1109/TIP.2012.2188036>.

* cited by examiner

RADAR APPARATUS, IMAGING METHOD, AND NON-TRANSITORY COMPUTER-READABLE MEDIUM

This application is a National Stage Entry of PCT/JP2020/044319 filed on Nov. 27, 2020, the contents of all of which are incorporated herein by reference, in their entirety.

TECHNICAL FIELD

The present invention relates to a radar apparatus, an imaging method, and a program in which imaging is performed by receiving an electromagnetic wave reflected on an object.

BACKGROUND ART

A radar apparatus for achieving a body scanner has been introduced in an airport and the like. In the radar apparatus, a transmission antenna irradiates an electromagnetic wave such as a millimeter wave onto a target object (such as a human body or belongings of a subject) within a predetermined area, and a reception antenna receives the electromagnetic wave reflected on the target object, as a radar signal. A body scanner system performs generation (imaging) of a radar image, based on a radar signal, and performs processing using a result of the imaging, for example, an inspection as to whether a subject carries a suspicious item. The radar image is generally acquired as a three-dimensional image in which a shape of an object within a three-dimensional space is reflected. In contrast, from a point of view such as easiness of interpretation for a person, or a computation cost of object recognition processing for automatically determining whether a subject carries a suspicious item, processing of forming a three-dimensional radar image into a two-dimensional image is useful.

Patent Document 1 describes a body scanner system in which antennas are arranged on a plurality of panels. Non-Patent Document 1 describes a method in which a three-dimensional radar image is formed into a two-dimensional image by projecting the radar image in a specific direction in order to apply an object detection algorithm for a two-dimensional image to the radar image. Non-Patent Documents 2 and 3 describe a technique in which a radar image of a target object is generated (imaged) by receiving an electromagnetic wave reflected on the target object by an antenna, and generating an image, based on a received signal.

Further, Patent Document 2 describes using three sets of opposing panels to view a front surface, a side surface, and a back surface of an inspection target.

RELATED DOCUMENT

Patent Document

Patent Document 1: Specification of U.S. Patent Application Publication No. 2019/0242990
Patent Document 2: Japanese Patent Application Publication (Translation of PCT Application) No. 2017-514109

Non-Patent Document

Non-Patent Document 1: L. Carrer and A. G. Yarovoy, "Concealed weapon detection using UWB 3-D radar imaging and automatic target recognition," The 8th European Conference on Antennas and Propagation (EuCAP 2014), The Hague, 2014, pp. 2786 to 2790, doi:10.1109/EuCAP.2014.6902403.
Non-Patent Document 2: S. S. Ahmed, A. Schiessl, F. Gumbmann, M. Tiebout, S. Methfessel and L. Schmidt, "Advanced Microwave Imaging," in IEEE Microwave Magazine, vol. 13, no. 6, pp. 26 to 43, September to October 2012, doi: 10.1109/MMM.2012.2205772.
Non-Patent Document 3: X. Zhuge and A. G. Yarovoy, "Three-Dimensional Near-Field MIMO Array Imaging Using Range Migration Techniques," in IEEE Transactions on Image Processing, vol. 21, no. 6, pp. 3026 to 3033, June 2012, doi: 10.1109/TIP.2012.2188036.

SUMMARY OF THE INVENTION

Technical Problem

In the above-described radar apparatus, accurately detecting belongings carried by a target object has been demanded. One example of an object of the present invention is to accurately detect belongings carried by a target object.

Solution to Problem

The present invention provides a radar apparatus including:
a radar signal transmission/reception unit that acquires a radar signal generated by using a plurality of transmission antennas and a plurality of reception antennas;
a projection direction/imaging policy control unit that holds an imaging policy including a projection direction representing a direction in which an inspection target is viewed, an imaging area indicating an area of which a three-dimensional radar image is to be generated, and set information being information on a set of pairs of a transmission antenna and a reception antenna for use in generation of the three-dimensional radar image;
an imaging unit that generates the three-dimensional radar image from the radar signal in accordance with the imaging policy; and
a projection processing unit that forms the generated three-dimensional radar image into a two-dimensional image by projecting the generated three-dimensional radar image in the projection direction indicated by the imaging policy.

The present invention provides an imaging method including,
by a computer:
radar signal transmission/reception processing of acquiring a radar signal generated by using a plurality of transmission antennas and a plurality of reception antennas;
projection direction/imaging policy control processing of holding an imaging policy including a projection direction representing a direction in which an inspection target is viewed, an imaging area indicating an area of which a three-dimensional radar image is to be generated, and set information being information on a set of pairs of a transmission antenna and a reception antenna for use in generation of the three-dimensional radar image;
imaging processing of generating the three-dimensional radar image from the radar signal in accordance with the imaging policy; and projection processing of forming the generated three-dimensional radar image into a two-dimensional image by projecting the generated three-dimensional radar image in the projection direction indicated by the imaging policy.

The present invention provides a program causing a computer to include:

a radar signal transmission/reception function of acquiring a radar signal generated by using a plurality of transmission antennas and a plurality of reception antennas;

a projection direction/imaging policy control function of holding an imaging policy including a projection direction representing a direction in which an inspection target is viewed, an imaging area indicating an area of which a three-dimensional radar image is to be generated, and set information being information on a set of pairs of a transmission antenna and a reception antenna for use in generation of the three-dimensional radar image;

an imaging function of generating the three-dimensional radar image from the radar signal in accordance with the imaging policy; and a projection processing function of forming the generated three-dimensional radar image into a two-dimensional image by projecting the generated three-dimensional radar image in the projection direction indicated by the imaging policy.

Advantageous Effects of Invention

According to the present invention, it is possible to accurately detect belongings carried by a target object.

BRIEF DESCRIPTION OF THE DRAWINGS

The above-described object, other objects, features, and advantages will become more apparent from suitable example embodiments described below and the following accompanying drawings.

DESCRIPTION OF EMBODIMENTS

Hereinafter, example embodiments according to the present invention are described with reference to the drawings. Note that, in all drawings, a similar constituent element is indicated by a similar reference sign, and description thereof is omitted as necessary.

First, a prerequisite technique is described.

Figure 1:
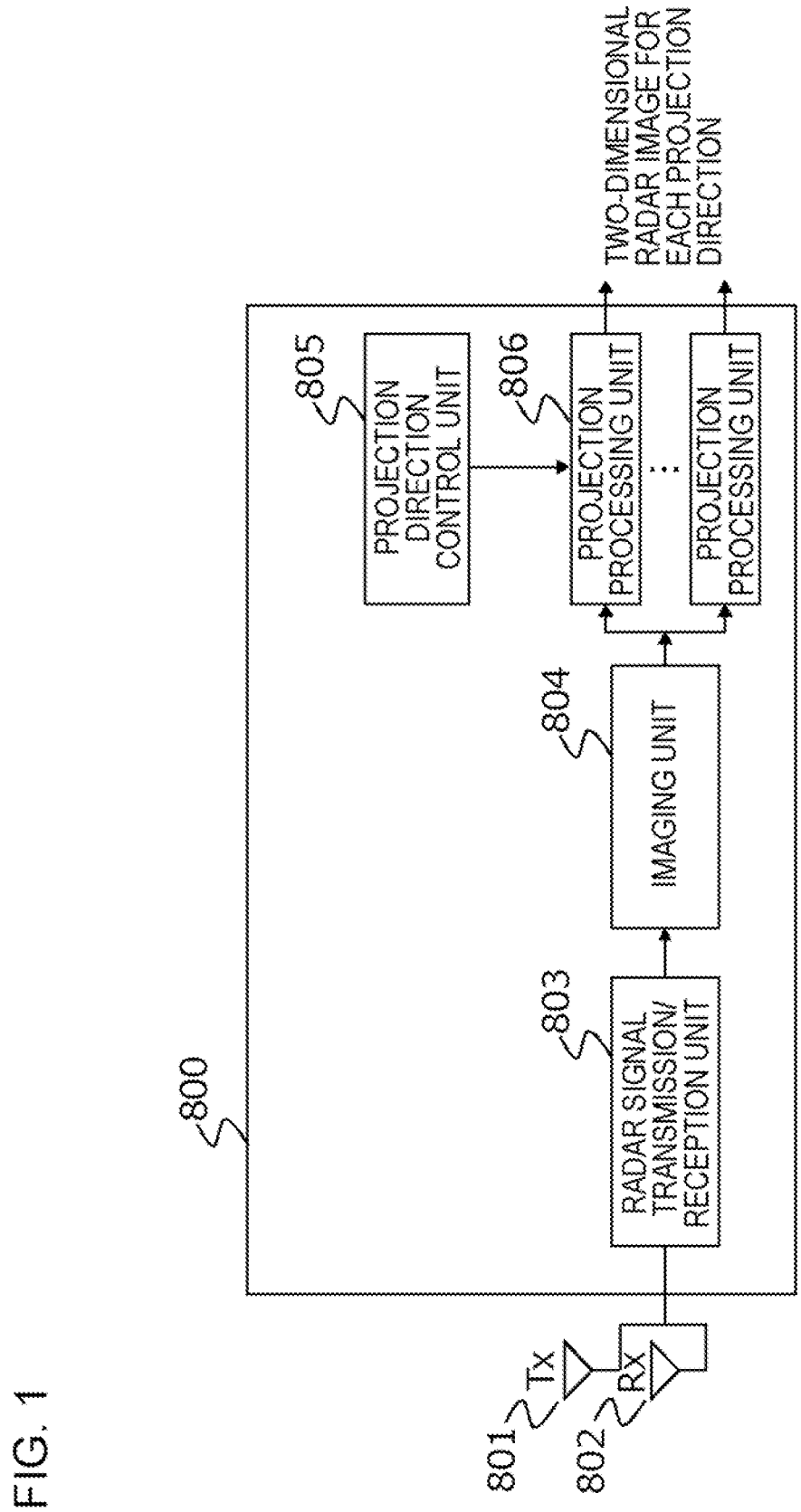
FIG. 1 is a block diagram illustrating a configuration example of a general radar apparatus.

FIG. 1 is a block diagram illustrating a configuration example of a general radar apparatus. A radar apparatus 800 illustrated in FIG. 1 includes a radar signal transmission/reception unit 803, an imaging unit 804, a projection direction control unit 805, and a projection processing unit 806. The radar signal transmission/reception unit 803 controls emission (specifically, an emission timing and the like) of an electromagnetic wave of a transmission antenna (Tx) 801 that emits an electromagnetic wave, and acquires a radar signal from a reception antenna (Rx) 802 that receives a reflected wave or the like from a target object. The imaging unit 804 generates a three-dimensional radar image from the radar signal. The projection direction control unit 805 holds a setting of a projection direction for forming the three-dimensional radar image into a two-dimensional image. The number of settings of the projection direction may be one or plural. The projection processing unit 806 projects a radar image generated by the imaging processing unit 804 in each projection direction set in the projection direction control unit 805, and generates a two-dimensional image associated with each of projection directions. Note that, FIG. 1 illustrates one transmission antenna (Tx) 801, and one reception antenna (Rx) 802, but actually, a plurality of Txs and a plurality of Rxs are installed.

The projection processing unit 806 performs projection processing based on an intensity sum of a radar image, for example, as described in Non-Patent Document 1. It is assumed that the projection processing unit 806 sets a Cartesian coordinates system XYZ in such a way that a projection direction is aligned with a Z axis, and a radar image in this case is written as I(X,Y,Z). I(X,Y,Z) is converted into a two-dimensional image I'(X,Y) in accordance with an equation (1).

[Mathematical 1]

$$I'(X,Y)=\Sigma_Z |I(X,Y,Z)|^2 \qquad (1)$$

Figure 2:
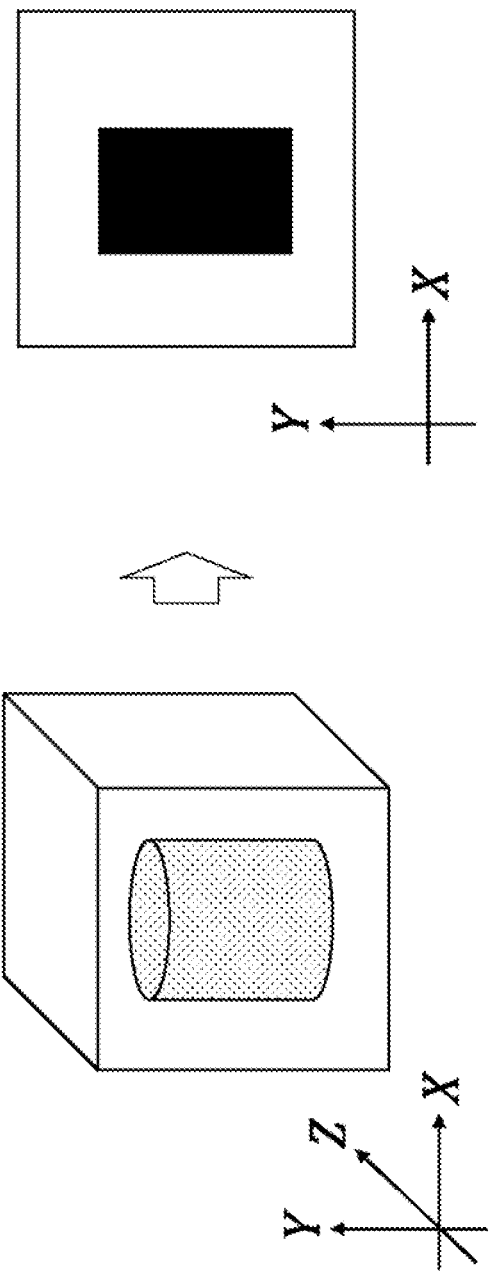
FIG. 2 is a diagram illustrating one example of a three-dimensional radar image.

In a case where a three-dimensional radar image as illustrated on a left side in FIG. 2 is acquired, the projection processing unit 806 generates, by the conversion, a two-dimensional image being projected with respect to the Z axis, as illustrated on a right side in FIG. 2. The two-dimensional image is associated with a way of appearance at a time when a target object is viewed according to a projection direction.

Figure 3:
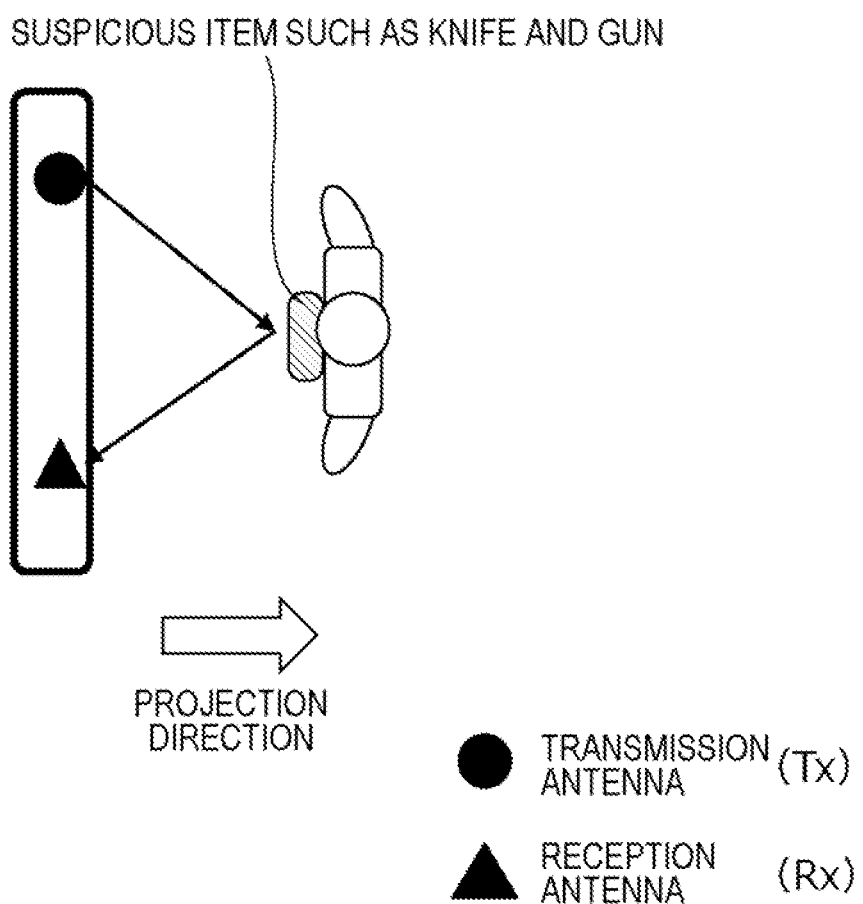
FIG. 3 is a diagram illustrating one example of an arrangement of a transmission antenna and a reception antenna.
Figure 4:
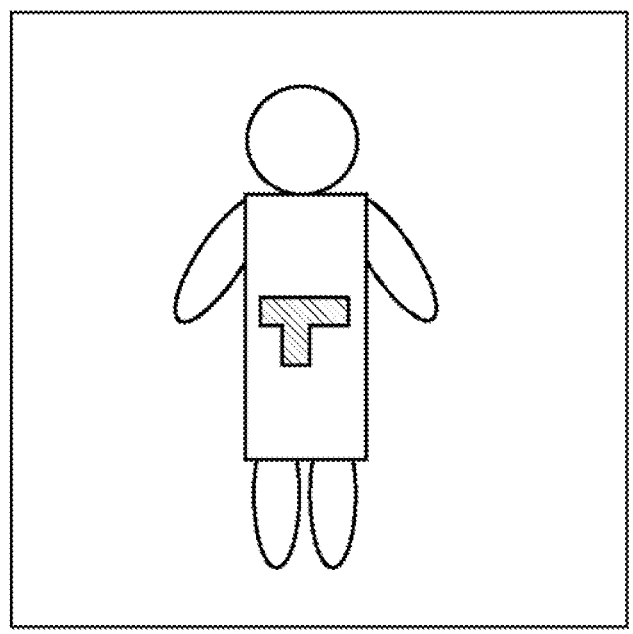
FIG. 4 is a diagram illustrating one example of a two-dimensional image.

A projection method in Non-Patent Document 1 functions well with respect to a radar image to be acquired from an apparatus as illustrated in FIG. 3 in which a Tx and an Rx are arranged on a same panel. On the other hand, in order to allow a certain object to be displayed on a radar image, a reflected wave in which an electromagnetic wave emitted from the Tx is reflected on the object is needed to be received by the Rx. Therefore, only a surface of a human body facing a panel side is displayed on a radar image to be acquired in FIG. 3, and a surface such as a surface opposite to the panel side, or both side surfaces, a wave reflected on which cannot be received by the Rx, is not displayed. In view of the above, as illustrated by arrows in FIG. 3, performing projection in a direction perpendicular to the panel enables to acquire, as illustrated in FIG. 4, a two-dimensional image associated with a situation in which a human body is viewed from a position on a side with the panel. As illustrated in FIG. 3, in a case where a suspicious item such as a knife or a gun is hidden on a surface facing the panel side, it is expected that the suspicious item appears on the image in FIG. 4.

Figure 5:
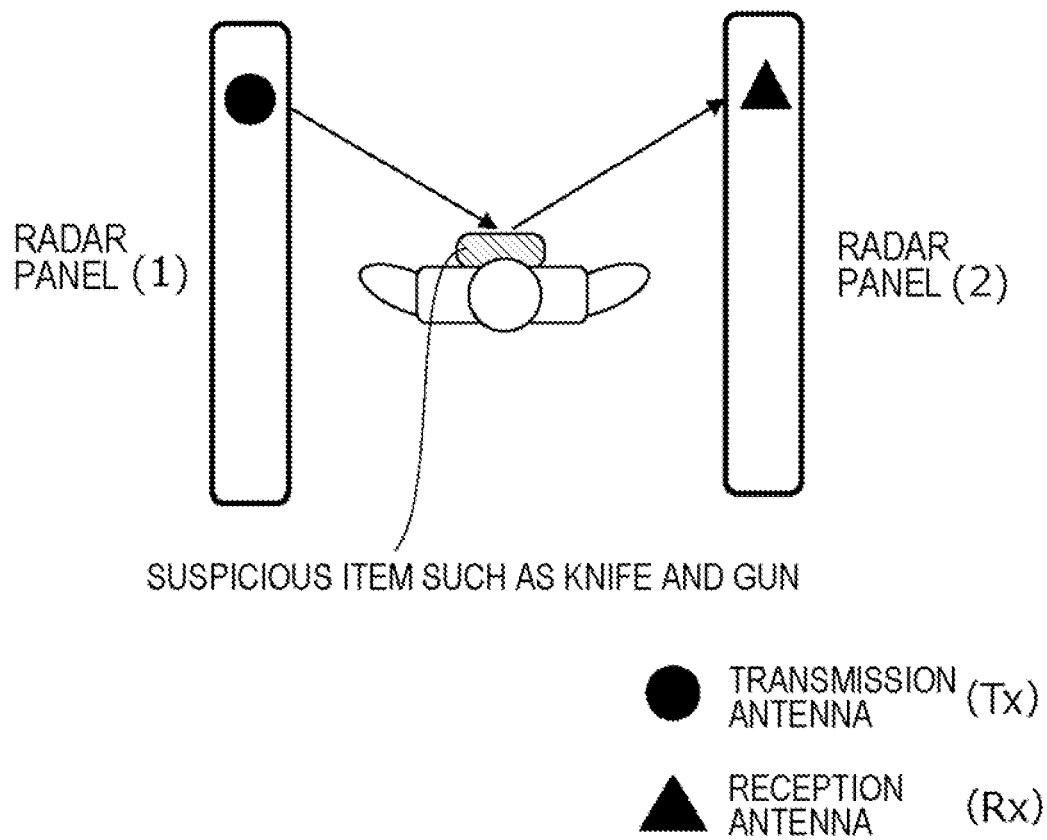
FIG. 5 is a diagram illustrating one example of an arrangement of a transmission antenna and a reception antenna.

Meanwhile, it is actually indefinite at which position, a suspicious item is hidden, and it is necessary to perform an inspection not only for one surface of a human body, but also for the entire surface thereof. Therefore, an apparatus in which an inspection for the entire surface of a human body is performed by arranging a Tx and an Rx on a plurality of panels is also conceived. For example, as illustrated in FIG. 5, arranging a panel on both sides, and acquiring a transmission/reception wave from one of the panels to the other panel also enables to capture reflection from an object facing in a direction perpendicular to the panel. Reflection from the object facing in a direction parallel to the panel can also be captured similarly to the apparatus in FIG. 3.

Figure 6:
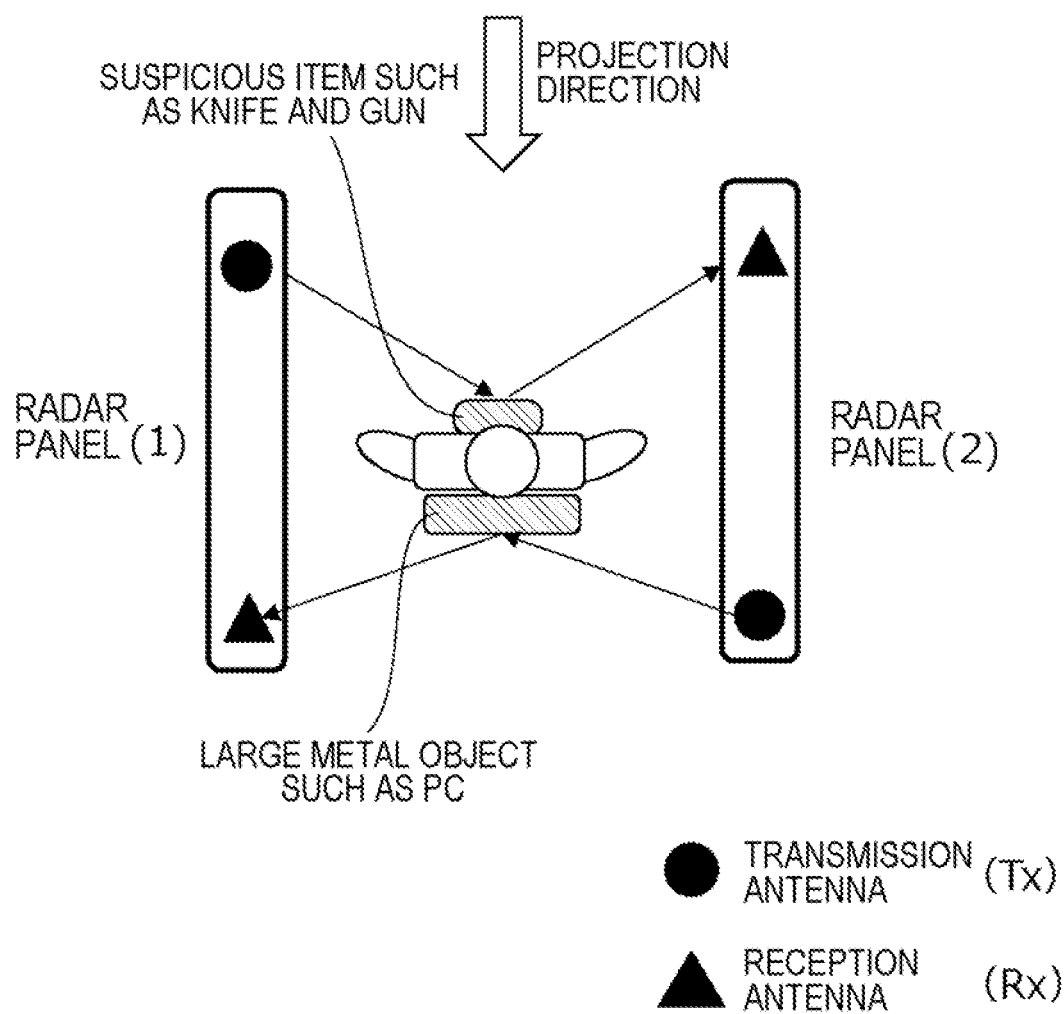
FIG. 6 is a diagram illustrating one example of an arrangement of a transmission antenna and a reception antenna.
Figure 7:
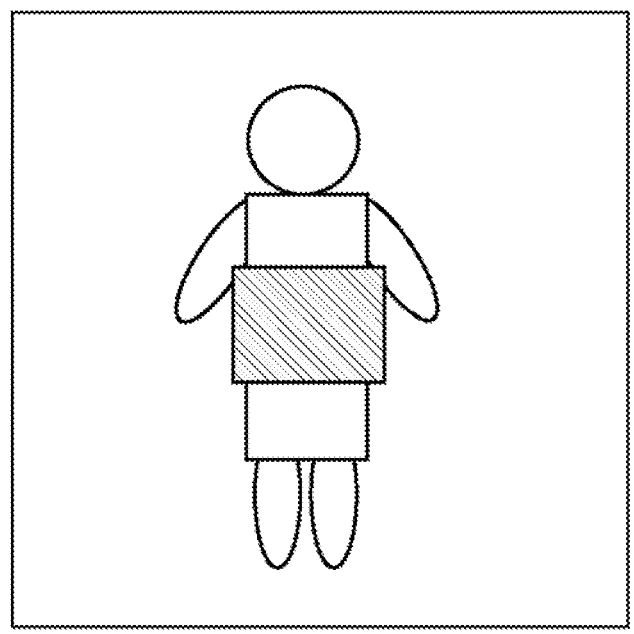
FIG. 7 is a diagram illustrating one example of a two-dimensional image.

On the other hand, it is not possible to apply a projection method described in Non-Patent Document 1 to a radar image acquired from an apparatus as illustrated in FIG. 5, and in which the entire surface of a human body is displayed. This is because pieces of information on a front surface and a back surface, or a right side surface and a left side surface of a human body is projected in a mixed manner. In particular, as a problematic example, as illustrated in FIG. 6, a situation in which a suspicious item is hidden on a front surface of a human body, and a large metal object such as a notebook personal computer is carried on a back surface is mentioned. When a three-dimensional radar image in this situation is formed into a two-dimensional image by projecting the three-dimensional radar image in a direction of an arrow in FIG. 6, as illustrated in FIG. 7, a shape of the suspicious item may be buried in the large metal object, and the suspicious item may be erased. In this way, in projection processing with respect to a radar image in which the entire surface of a human body is displayed, information on a surface viewed from a direction being originally desired to view may be erased by an opposing surface. Consequently, accuracy of suspicious item inspection is lowered.

First Example Embodiment

[Description on Configuration]

Figure 8:
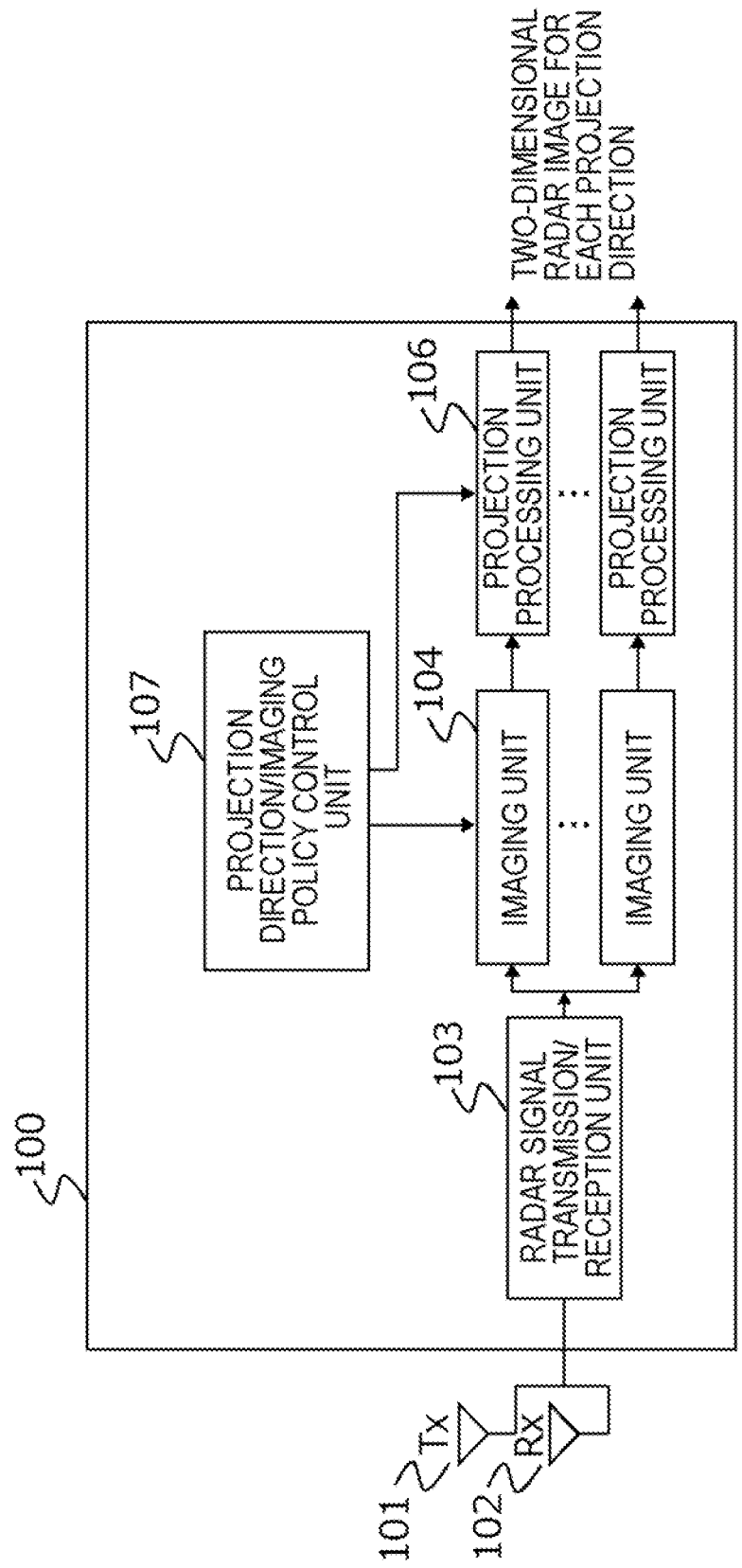
FIG. 8 is a block diagram illustrating a configuration example of a radar apparatus according to a first example embodiment.

FIG. 8 is a block diagram illustrating a configuration example of a radar apparatus according to a first example embodiment. A radar apparatus 100 according to the first example embodiment includes a radar signal transmission/reception unit 103, a projection direction/imaging policy control unit 107, an imaging unit 104, and a projection processing unit 106. The radar signal transmission/reception unit 103 includes a transmission antenna (Tx) 101 and a reception antenna (Rx) 102.

Figure 9:
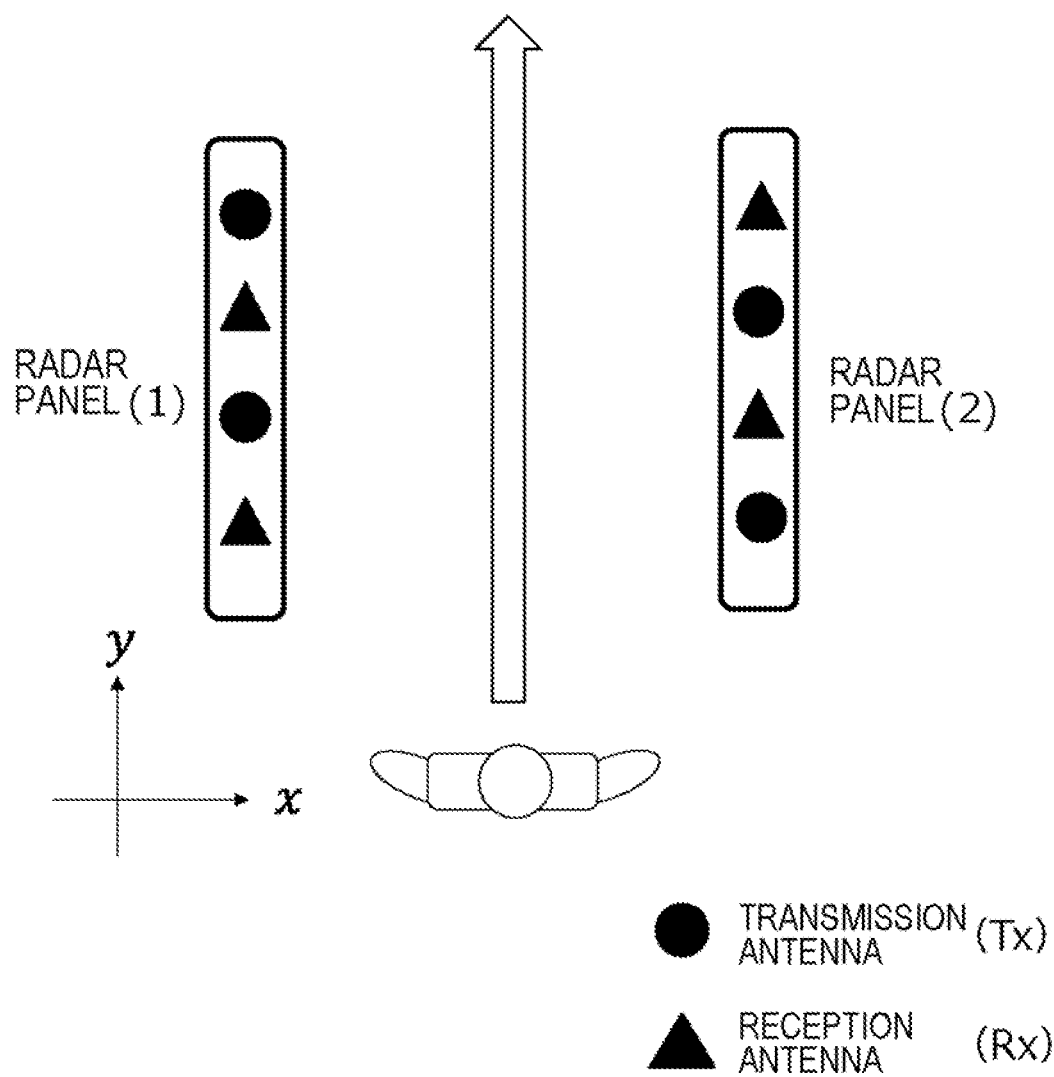
FIG. 9 is a diagram illustrating one example of an arrangement of a transmission antenna and a reception antenna.

As illustrated in FIG. 9, an external appearance of the radar apparatus is configured in such a way that a plurality of (e.g., two) panels are aligned, and a subject who undergoes an inspection passes through a space between the panels. Hereinafter, a coordinate system in which a traveling direction of a subject is aligned with a y axis is employed.

The radar signal transmission/reception unit 103 controls emission (specifically, an emission timing and the like) of an electromagnetic wave of the transmission antenna (Tx) 101 that emits an electromagnetic wave such as a millimeter wave, and acquires a radar signal from the reception antenna (Rx) 102 that receives a reflected wave or the like from a target object. Note that, FIG. 8 illustrates one transmission antenna (Tx) 101 and one reception antenna (Rx) 102, but actually, there are a plurality of Txs and a plurality of Rxs, which are installed within at least two panels, as illustrated in FIG. 9.

The radar signal transmission/reception unit 103 controls transmission (emission) of an electromagnetic wave performed by the transmission antenna (Tx) 101, and acquires a radar signal based on a wave received by the reception antenna (Rx) 102. Specifically, for example, Txs perform emission in order according to an emission order of the Tx being determined in advance, all Rxs receive a reflected wave, and thereby a radar signal is acquired regarding all pairs of the Tx and the Rx. The acquired radar signals are output to the imaging unit 104, as one set of radar signals. Note that, in a case where there is a pair of a Tx and an Rx in which a radar signal is not necessary, the radar signal of the pair may not be acquired. The radar signal transmission/reception unit 103 repeatedly performs acquisition and output of one set of radar signals at a predetermined time interval or the like.

The projection direction/imaging policy control unit 107 holds an imaging policy. The imaging policy includes information such as a projection direction for forming a three-dimensional radar image into a two-dimensional image, an imaging area with respect to each projection direction, and a set (set information) of pairs of a Tx and an Rx for use in imaging. The projection direction is associated with from which direction, a human body is viewed when a two-dimensional image is generated. A plurality of projection directions may be set in one imaging policy. The imaging area indicates a spatial area on which generation (imaging) of a radar image is performed. Generally, when an image in which a human body is viewed from a certain specific direction is generated, a standing position of the human body within an apparatus being suitable for displaying a surface associated with the direction, and a set of pairs of a Tx and an Rx for use in imaging are different according to the direction. An imaging policy is set for each projection direction according to the difference.

As an example, description is made under a situation in which, in a method of using two panels installed in such a way as to face a passage through which a subject (inspection target) passes as illustrated in FIG. 9, four projection directions in which a left side surface, a right side surface, a front surface, and a back surface of a human body are viewed are used. In this example, the projection direction includes four directions at an interval of 90°, and these four directions are perpendicular or parallel to the two panels. Note that, in FIG. 9, the two panels are aligned in parallel to a traveling direction of the inspection target, but the two panels may be installed in parallel as described above, or may be installed in a non-parallel arrangement. In the following description, it is assumed that a y coordinate of a central position of a panel is $y_0$.

Figure 10:
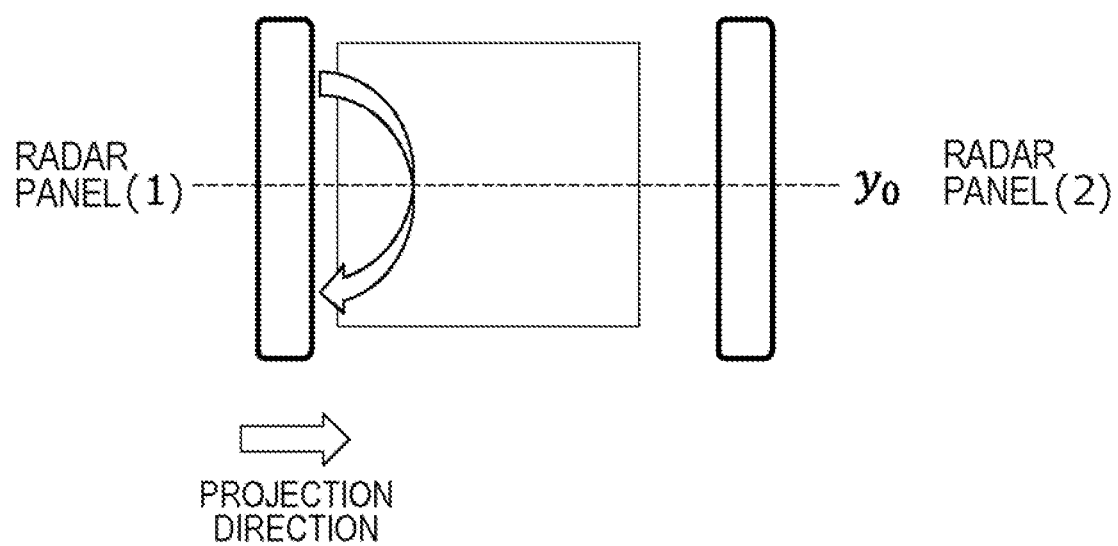
FIG. 10 is a diagram illustrating an imaging policy.
Figure 11:
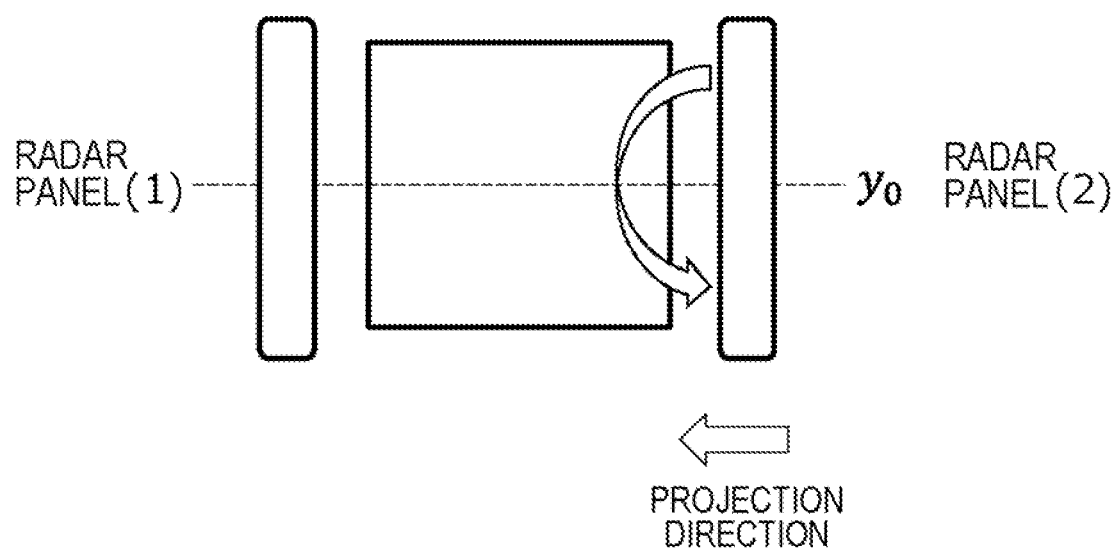
FIG. 11 is a diagram illustrating an imaging policy.

In order to display only the left side surface of a human body, it is preferable to use only a pair in which both of a Tx and an Rx are within a radar panel (1), assuming that an area close to $y=y_0$ such as a rectangular area in FIG. 10 is a standing position. Therefore, regarding a projection direction indicated by an arrow in FIG. 10, an imaging policy is set in which an imaging area is set such as the rectangular area in FIG. 10, and imaging is performed only by a pair of a Tx and an Rx, both of which are within the radar panel (1). Also regarding the right side surface of the human body, a configuration is almost the same, and regarding a projection direction indicated by an arrow in FIG. 11, an imaging policy is set in which an imaging area is set such as a rectangular area in FIG. 11, and imaging is performed only by a pair of a Tx and an Rx, both of which are within a radar panel (2). Note that, the imaging areas in FIGS. 10 and 11 may be the same, or different from each other.

Figure 12:
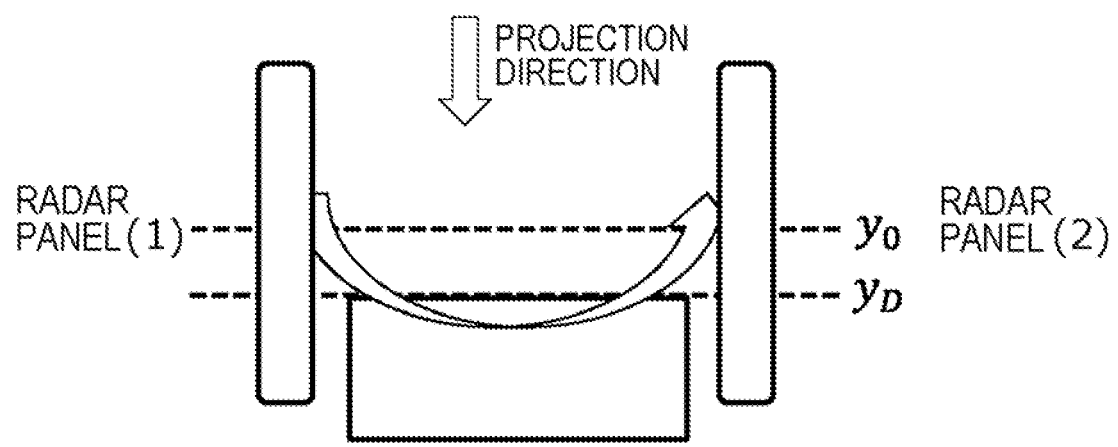
FIG. 12 is a diagram illustrating an imaging policy.

Meanwhile, in order to display only the front surface of the human body, it is preferable to use only a pair in which a Tx is within the radar panel (1), and an Rx is within the radar panel (2), assuming that an area represented by $y<y_0$ (more specifically, $y \leq y_D$ by setting $y_D < y_0$) such as a rectangular area in FIG. 12 is a standing position (panels incorporated with the Tx and the Rx may be reversed, or both of the panels may be used). Further, a Tx and an Rx that are at a position of $y \leq y_D$ is less likely to contribute to displaying the front surface of a human body, and rather may display unnecessary information on the back surface. Therefore, a pair of a Tx and an Rx that are at a position of $y \leq y_D$ may not be used for imaging. An imaging policy regarding a projection direction indicated by an arrow in FIG. 12 is set according to the above.

Figure 13:
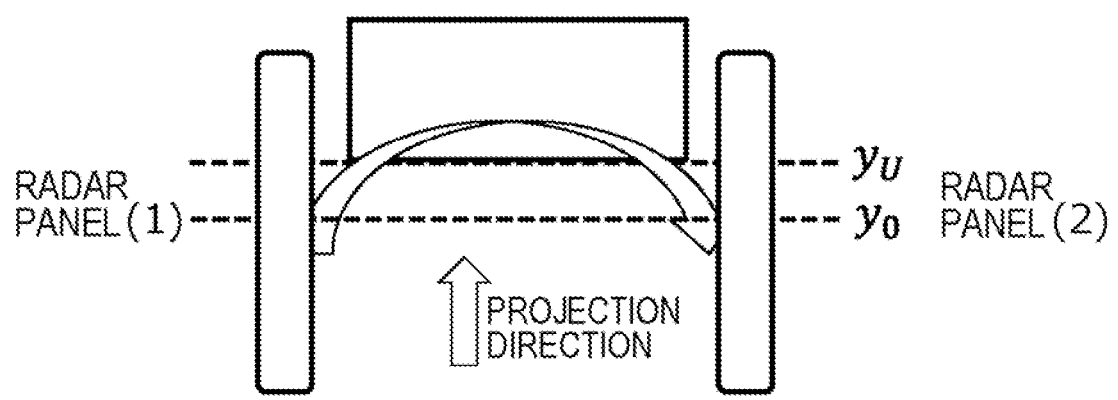
FIG. 13 is a diagram illustrating an imaging policy.

Also regarding the back surface of the human body, a configuration is almost the same, and an imaging policy regarding a projection direction indicated by an arrow in FIG. 13 can be set in a similar manner. Also in this case, a pair of a Tx and an Rx that are at a position of $y \geq y_U$ may not be used for imaging.

It is desirable that among images captured while the subject passes through the apparatus as illustrated in FIG. 9, at least one image in which a human body of a subject is captured is included for each projection direction. For this reason, for example, the radar signal transmission/reception unit 103 acquires a radar signal at a cycle which allows at least one set of radar signals to be acquired while a subject walking at supposed velocity passes through each imaging area.

The imaging units 104 are present in a distributed manner by the number equal to the number of projection directions set in the projection direction/imaging policy control unit 107, and each imaging unit 104 is associated with each projection direction. Each of the imaging units 104 receives a necessary radar signal from the radar signal transmission/reception unit 103 according to a set of pairs of a Tx and an Rx being defined by an imaging policy on the associated projection direction. Each of the imaging units 104 performs, from the received radar signal, generation (imaging) of a three-dimensional radar image within an imaging area defined by the imaging policy. One example of a procedure (imaging algorithm) for computing (generating) a radar image from a radar signal is described in Non-Patent Documents 2 or 3. Each of the imaging units 104 outputs the generated radar image to the projection processing unit 106.

There may be a case in which all signals necessary for imaging are collected before the radar signal transmission/reception unit 103 acquires one set of radar signals covering all pairs of a Tx and an Rx, depending on an associated projection direction. Each of the imaging units 104 may receive a radar signal, and start imaging, even before the radar signal transmission/reception unit 103 acquires one set of radar signals.

Further, an appropriate imaging algorithm may change depending on an imaging area, or a set of pairs of a Tx and an Rx for use. For example, a method described in Non-Patent Document 3 is superior in a computation speed, but there is a constraint that all Txs and Rxs should be installed on a same plane, therefore, the method can be applied to imaging associated with FIGS. 10 and 11, but cannot be applied to imaging associated with FIGS. 12 and 13. On the other hand, since there is no constraint regarding an arrangement of an antenna in a method described in Non-Patent Document 2, the method can also be applied to imaging associated with FIGS. 12 and 13. Based on a difference in an imaging algorithm as described above, information (also may include an imaging algorithm itself) for specifying an imaging algorithm may be added to an imaging policy for each projection direction, the imaging policy may be set in the projection direction/imaging policy control unit 107, and the imaging unit 104 is instructed therewith.

The projection processing units 106 are present in a distributed manner by the number equal to the number of projection directions set in the projection direction/imaging policy control unit 107, and each of the projection processing units 106 is associated with each projection direction. Each of the projection processing units 106 receives a three-dimensional radar image from the imaging unit 104 associated with the same projection direction, and forms the three-dimensional radar image into a two-dimensional image by performing projection processing according to the set projection direction. In the following description, it is assumed that a Cartesian coordinates system XYZ is defined in such a way that a projection direction is aligned with a Z axis, and a radar image in this case is written as I(X,Y,Z). The projection processing performs conversion into a two-dimensional image I'(X,Y), for example, in accordance with the equation (1), as described in Non-Patent Document 1. A method as expressed by an equation (2) is also conceivable as another projection method.

[Mathematical 2]
$$I'(X, Y) = \max_Z |I(X, Y, Z)| \tag{2}$$

Each of the projection processing units 106 outputs the generated two-dimensional image to a display, an image processing engine, or the like.

[Description on Operation]

Figure 14:
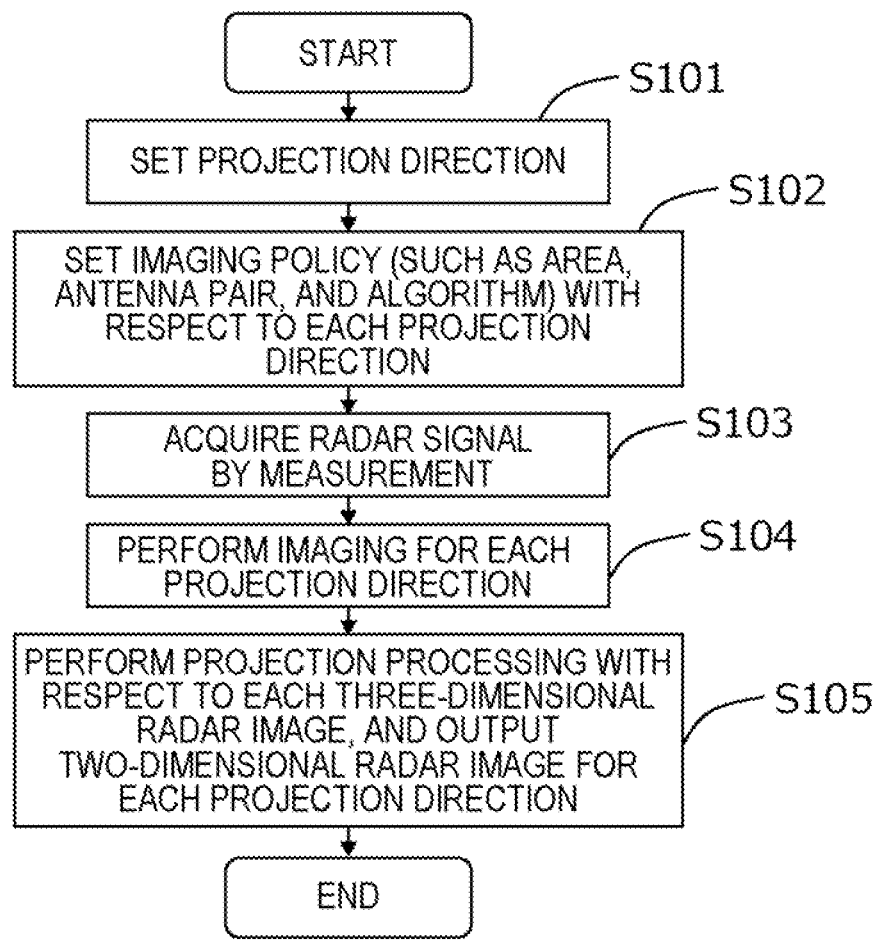
FIG. 14 is a flowchart illustrating an operation of the radar apparatus.

Next, an operation of the radar apparatus 100 is described with reference to a flowchart in FIG. 14.

In step S101, a projection direction representing from which direction, a human body is viewed when a two-dimensional image is generated is determined, and the setting is held in the projection direction/imaging policy control unit 107. The setting is performed, for example, by a user or an administrator of the radar apparatus 100. Further, the same number of the imaging units 104 and the projection processing units 106 are prepared as the number of the set projection directions.

In step S102, each piece of information included in the imaging policy is determined for each projection direction set in step S101. Information to be determined herein includes an imaging area suitable for generating an image in which a human body is viewed from the direction, and set information indicating a set of pairs of a Tx and an Rx. These pieces of information are held in the projection direction/imaging policy control unit 107. In this way, the projection direction/imaging policy control unit 107 holds the imaging policy for each projection direction.

In step S103, the radar signal transmission/reception unit 103 causes the transmission antenna (Tx) 101 to emit an electromagnetic wave, acquires a radar signal based on a wave received by the reception antenna (Rx) 102, and outputs the acquired radar signal to the imaging unit 104.

In step S104, each of the imaging units 104 generates, from the radar signal, a three-dimensional radar image in accordance with the imaging policy regarding the projection direction associated with the imaging unit 104, the imaging policy being held in the projection direction/imaging policy control unit 107, and outputs the three-dimensional radar image to the projection processing unit 106.

In step S105, each of the projection processing units 106 receives the three-dimensional radar image from the imaging unit 104 associated with the same projection direction, and forms the three-dimensional radar image into a two-dimensional image by performing the projection processing according to the set projection direction. Each of the generated two-dimensional images is output to a display, an image processing engine, or the like.

<Hardware Configuration Example>

Figure 19:
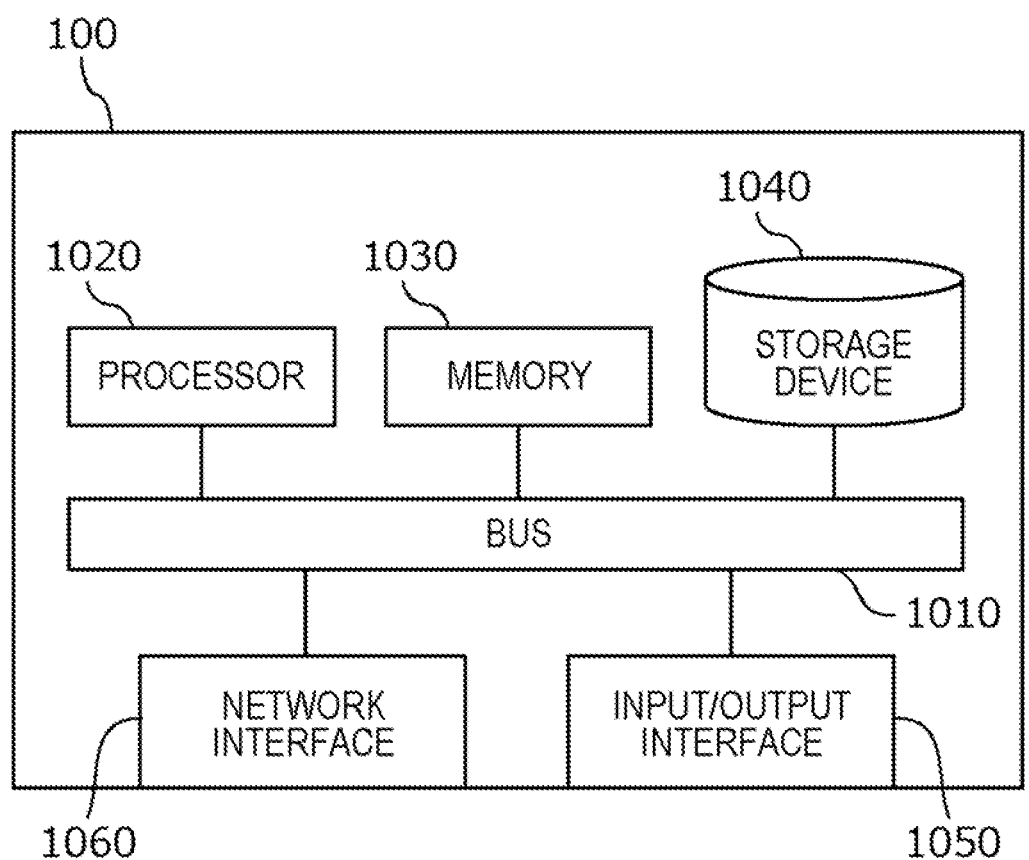
FIG. 19 is a diagram illustrating one example of a hardware configuration of the radar apparatus.

FIG. 19 is a diagram illustrating a hardware configuration example of the radar apparatus 100. The radar apparatus 100 includes a bus 1010, a processor 1020, a memory 1030, a storage device 1040, an input/output interface 1050, and a network interface 1060.

The bus 1010 is a data transmission path along which the processor 1020, the memory 1030, the storage device 1040, the input/output interface 1050, and the network interface 1060 mutually transmit and receive data. However, a method of mutually connecting the processor 1020 and the like is not limited to bus connection.

The processor 1020 is a processor to be achieved by a central processing unit (CPU), a graphics processing unit (GPU), or the like.

The memory 1030 is a main storage to be achieved by a random access memory (RAM) or the like.

The storage device 1040 is an auxiliary storage to be achieved by a hard disk drive (HDD), a solid state drive (SSD), a memory card, a read only memory (ROM), or the like. The storage device 1040 stores a program module achieving each function of the radar apparatus 100. The processor 1020 achieves each function associated with each program module by reading the program module in the memory 1030 and executing the program module.

The input/output interface 1050 is an interface for connecting the radar apparatus 100 and various pieces of input/output equipment with each other.

The network interface 1060 is an interface for connecting the radar apparatus 100 to a network. The network is, for example, a local area network (LAN) or a wide area network (WAN). A method of connecting the network interface 1060 to a network may be wireless connection, or may be wired connection.

Description on Advantageous Effect

According to the present example embodiment, the radar apparatus 100 enables to prevent information on another surface, particularly, a back surface from being displayed on a radar image by properly using an imaging area, and a set of pairs of a Tx and an Rx for use in imaging in such a way that a surface in each projection direction is clearly displayed. Therefore, the radar apparatus 100 can accurately generate an image in which a human body is viewed from each projection direction. This improves detection accuracy and the like of belongings (e.g., a suspicious item) carried by a target object.

Second Example Embodiment

[Description on Configuration]

Figure 15:
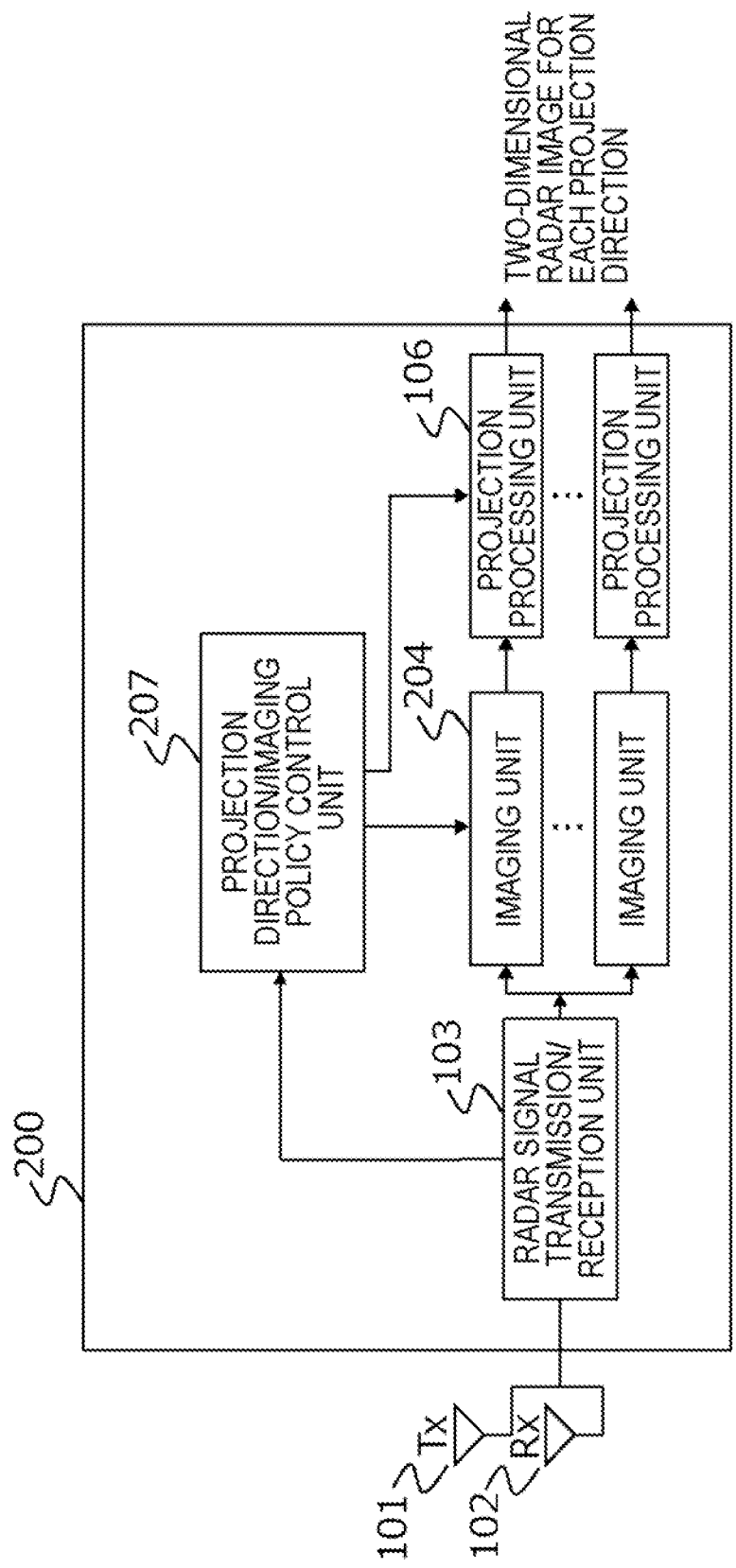
FIG. 15 is a block diagram illustrating a configuration example of a radar apparatus according to a second example embodiment.

FIG. 15 is a block diagram illustrating a configuration example of a radar apparatus according to a second example embodiment. A radar apparatus 200 according to the second example embodiment includes a radar signal transmission/reception unit 103, a projection direction/imaging policy control unit 207, a plurality of imaging units 204, and a plurality of projection processing units 106. The radar signal transmission/reception unit 103 includes a transmission antenna (Tx) 101 and a reception antenna (Rx) 102.

In the first example embodiment, even when a subject is not present within an imaging area, each of the imaging units 104 constantly performs imaging processing. In the second example embodiment, for reduction of a computation cost, each of the imaging units 204 performs the imaging processing only when a subject is present within an imaging area. Note that, details on the imaging processing to be performed by the imaging unit 204 is similar to the imaging processing to be performed by the imaging unit 104.

A function of each block other than the projection direction/imaging policy control unit 207, and the imaging unit 204 is the same as a function of the equivalent block according to the first example embodiment. However, regarding the radar signal transmission/reception unit 103, modification is performed in such a way that a radar signal is also output to the projection direction/imaging policy control unit 207.

The projection direction/imaging policy control unit 207 plays a role of a function of determining whether a subject is present within an imaging area associated with each projection direction, based on a radar signal received from the radar signal transmission/reception unit 103, in addition to a function described in the first example embodiment. Each determination result is output to the imaging unit 204.

As an example of a determination method, a method is cited in which a three-dimensional radar image for presence determination is generated by imaging an area including all imaging areas, and a distribution of reflection intensity of an electromagnetic wave within the radar image for presence determination is used. The radar image for presence determination is an image different from a radar image to be generated finally. It is assumed that the radar image for presence determination is $I_0(x,y,z)$. Since the radar image is used only for presence determination of a subject, it is not necessary to include detailed information regarding a shape, and computation may be performed only by sparse sampling points. Further, computation may be performed by using all radar signals, or computation may be performed by using only a radar signal covering a part of pairs of a Tx and an Rx. When it is determined whether a subject is present in an area R, for example, it is determined that a subject is present when a formula (3) is satisfied by using a certain threshold value t.

[Mathematical 3]
$$\max_{(x,y,z)\in R} |I_0(x, y, z)| > t \quad (3)$$

Each of the imaging units 204 performs similar processing to that in the first example embodiment, only in a case where the projection direction/imaging policy control unit 207 determines that a subject is present within an imaging area of the associated projection direction. On the other hand, the imaging unit 204 skips the processing, in a case where it is determined that a subject is not present within an imaging area associated with the projection direction associated with the imaging unit 204.

[Description on Operation]

Figure 16:
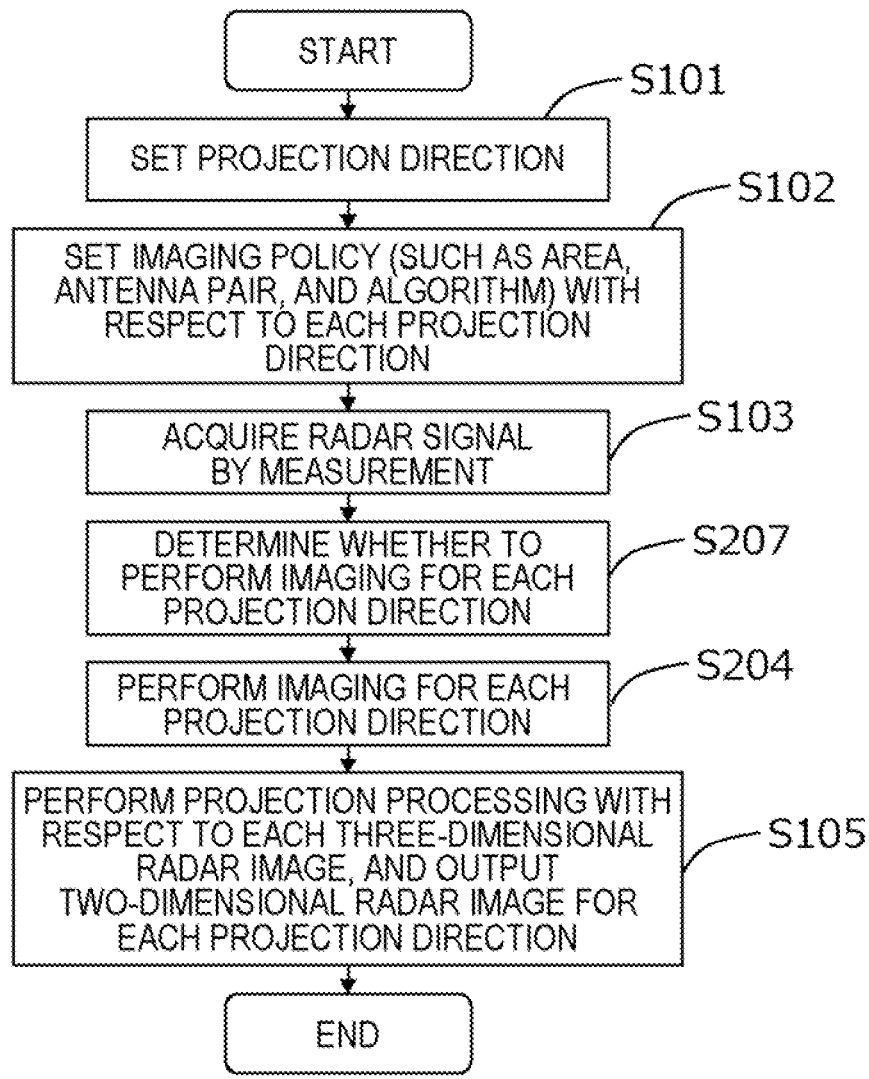
FIG. 16 is a flowchart illustrating an operation of the radar apparatus.

Next, an operation of the radar apparatus 200 is described with reference to a flowchart in FIG. 16.

Pieces of processing of steps S101 and S102 are the same as those in the first example embodiment. Processing of step S103 is the same as that in the first example embodiment. However, a radar signal is also output to the projection direction/imaging policy control unit 207.

Next, in step S207, the projection direction/imaging policy control unit 207 determines whether a subject is present within an imaging area associated with each projection direction, based on a radar signal received from the radar signal transmission/reception unit 103, and outputs each determination result to the imaging unit 204.

In step S204, in a case where the projection direction/imaging policy control unit 207 determines that a subject is present within an imaging area of the projection direction associated with each of the imaging units 204, the imaging unit generates a three-dimensional radar image from a radar signal in accordance with an imaging policy set for the imaging unit 204 in the projection direction/imaging policy control unit 207, and outputs the generated three-dimensional radar image to the projection processing unit 106.

Processing of step S105 is the same as that in the first example embodiment.

Description on Advantageous Effect

According to the present example embodiment, it is possible to reduce a computation cost, while maintaining detection accuracy of belongings at a substantially same level as that in the first example embodiment, by omitting imaging processing with respect to an area where a subject is not present.

Third Example Embodiment

[Description on Configuration]

Figure 17:
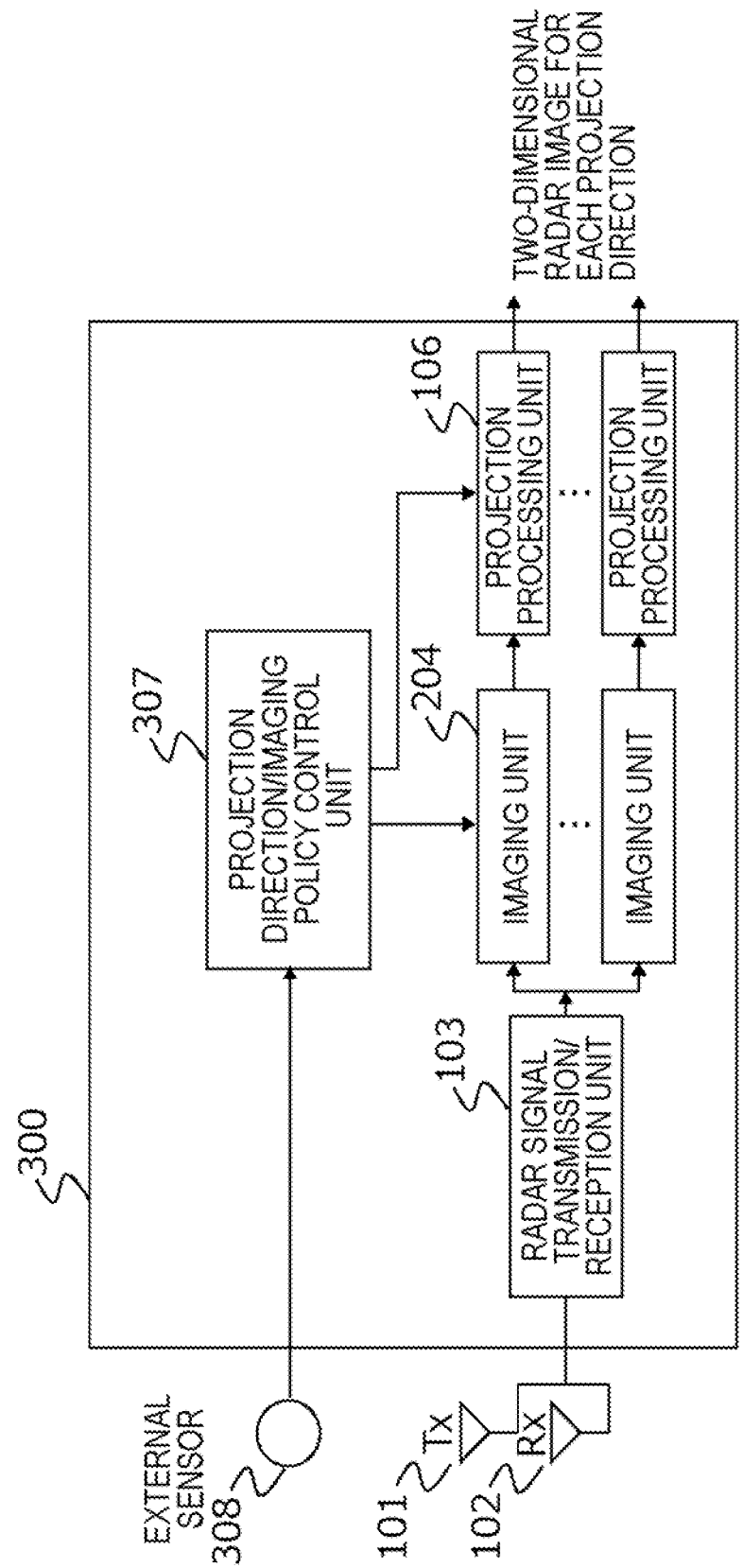
FIG. 17 is a block diagram illustrating a configuration example of a radar apparatus according to a third example embodiment.

FIG. 17 is a block diagram illustrating a configuration example of a radar apparatus according to a third example embodiment. A radar apparatus 300 according to the third example embodiment includes a radar signal transmission/reception unit 103, a projection direction/imaging policy control unit 307, a plurality of imaging units 204, a plurality of projection processing units 106, and an external sensor 308. The radar signal transmission/reception unit 103 includes a transmission antenna (Tx) 101 and a reception antenna (Rx) 102.

In the second example embodiment, a radar signal is used for determining whether a subject is present within each imaging area. In the third example embodiment, presence determination of a subject is performed by the external sensor 308 capable of acquiring information regarding presence of a subject, such as a pressure sensor or a camera.

A function of a block other than the projection direction/imaging policy control unit 307, the imaging unit 204, and the external sensor 308 is the same as a function in the first example embodiment. A function of the imaging unit 204 is the same as a function in the second example embodiment.

The external sensor 308 acquires measurement information of a sensor at a same timing as that of radar signal acquisition by the radar signal transmission/reception unit 103, and outputs the acquired measurement information to the projection direction/imaging policy control unit 307. As an example of the external sensor 308, a pressure sensor installed on a floor is cited. In this case, the external sensor 308 outputs, to the projection direction/imaging policy control unit 307, information indicating at which position, a subject is stepping on the floor, and the like.

The projection direction/imaging policy control unit 307 plays a role of a function of determining whether a subject is present within an imaging area associated with each projection direction, based on information received from the external sensor 308, in addition to a function described in the first example embodiment. As described in the above example, in a case where a pressure sensor installed on a floor is used as the external sensor 308, a method in which presence of a subject is determined, when a vicinity of a position immediately below an imaging area is stepped on (e.g., when the external sensor 308 is reacting), is cited. Each determination result is output to the imaging unit 204.

[Description on Operation]

Figure 18:
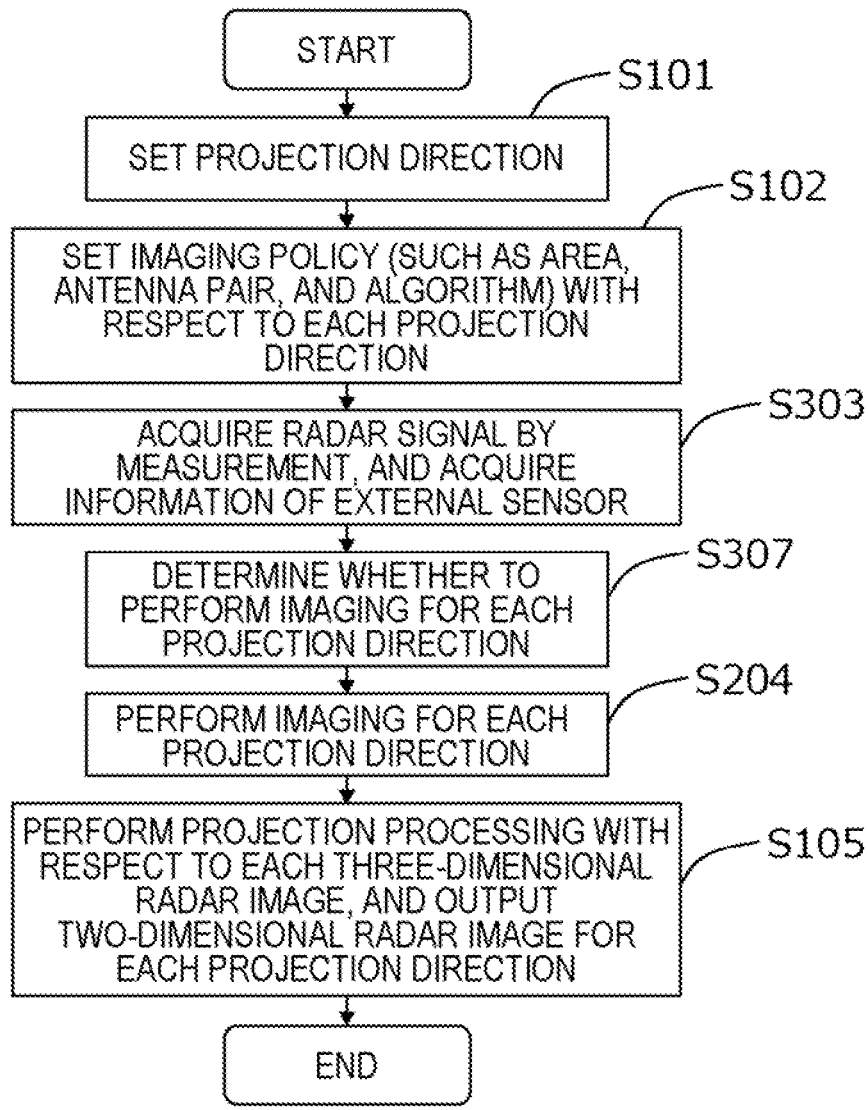
FIG. 18 is a flowchart illustrating an operation of the radar apparatus.

Next, an operation of the radar apparatus 300 is described with reference to a flowchart in FIG. 18.

Pieces of processing of steps S101 and S102 are the same as those in the first example embodiment. In step S303, the radar signal transmission/reception unit 103 causes the transmission antenna (Tx) 101 to emit an electromagnetic wave, acquires a radar signal based on a wave received by the reception antenna (Rx) 102, and outputs the acquired radar signal to the imaging unit 104. At the same timing as described above, the external sensor 308 acquires measurement information, and outputs the acquired measurement information to the projection direction/imaging policy control unit 307.

In step S307, the projection direction/imaging policy control unit 307 determines whether a subject is present within an imaging area associated with each projection direction, based on the measurement information received from the external sensor 308. Each determination result is output to the imaging unit 204.

Processing of step S204 is the same as that in the second example embodiment. Further, processing of step S105 is the same as that in the first example embodiment.

Description of Advantageous Effect

Similarly to the second example embodiment, omitting imaging processing with respect to an area where a subject is not present enables to reduce computation processing, while maintaining accuracy of an inspection and the like at a substantially same level as that in the first example embodiment. Further, depending on a sensor for use in presence determination of a subject, improvement such that a computation cost is further reduced, or determination accuracy becomes better can be expected, as compared with a method in which presence determination is performed by using a radar signal as described in the second example embodiment.

As described above, while the example embodiments according to the present invention have been described with reference to the drawings, these example embodiments are an example of the present invention, and various configurations other than the above can also be adopted.

Further, in a plurality of flowcharts used in the above description, a plurality of processes (pieces of processing) are described in order, but an order of execution of processes to be performed in each example embodiment is not limited to the order of description. In each example embodiment, the order of illustrated processes can be changed within a range that does not adversely affect a content. Further, the above-described example embodiments can be combined, as far as contents do not conflict with each other.

A part or all of the above-described example embodiments may also be described as the following supplementary notes, but is not limited to the following.

1. A radar apparatus including:
    a radar signal transmission/reception unit that acquires a radar signal generated by using a plurality of transmission antennas and a plurality of reception antennas;
    a projection direction/imaging policy control unit that holds an imaging policy including a projection direction representing a direction in which an inspection target is viewed, an imaging area indicating an area of which a three-dimensional radar image is to be generated, and set information being information on a set of pairs of a transmission antenna and a reception antenna for use in generation of the three-dimensional radar image;
    an imaging unit that generates the three-dimensional radar image from the radar signal in accordance with the imaging policy; and
    a projection processing unit that forms the generated three-dimensional radar image into a two-dimensional image by projecting the generated three-dimensional radar image in the projection direction indicated by the imaging policy.
2. The radar apparatus according to supplementary note 1, in which
    the imaging policy includes an algorithm for generating the three-dimensional radar image from the radar signal, or information that specifies the algorithm, and
    the imaging unit generates the three-dimensional laser-radar image by using the algorithm.
3. The radar apparatus according to supplementary note 1 or 2, in which
    the transmission antenna and the reception antenna are arranged within at least two panels facing each other with a passage through which an inspection target passes interposed.
4. The radar apparatus according to supplementary note 3, in which
    the two panels are parallel to each other.
5. The radar apparatus according to any one of supplementary notes 1 to 4, in which
    the imaging policy is set for each of a plurality of the projection directions, and
    the plurality of the projection directions include a front surface, a back surface, a left side surface, and a right side surface of the inspection target.
6. The radar apparatus according to supplementary note 4, in which
    the imaging policy is set for each of the plurality of the projection directions,
    the projection direction includes four directions at an interval of 90°, and
    the four directions are perpendicular or parallel to the two panels.
7. The radar apparatus according to any one of supplementary notes 1 to 6, in which
    the projection direction/imaging policy control unit performs determination as to whether the inspection target is present within the imaging area, and,
    in a case where it is determined that the inspection target is present within the imaging area, the imaging unit performs generation of the three-dimensional radar image.
8. The radar apparatus according to supplementary note 7, in which
    the projection direction/imaging policy control unit performs determination as to whether the inspection target is present within the imaging area, based on the radar signal.
9. The radar apparatus according to supplementary note 8, in which
    the projection direction/imaging policy control unit performs determination as to whether the inspection target is present within the imaging area by generating, from the radar signal, a radar image for presence determination in an area including the imaging area, and based on a distribution of reflection intensity of an electromagnetic wave within the temporary radar image.
10. The radar apparatus according to supplementary note 7, in which
    the projection direction/imaging policy control unit performs determination as to whether the inspection target is present within the imaging area by using a measurement result of a sensor capable of recognizing presence of the inspection target.
11. The radar apparatus according to supplementary note 10, in which
    the sensor is a pressure sensor installed on a floor.
12. An imaging method including,
    by a computer:
    radar signal transmission/reception processing of acquiring a radar signal generated by using a plurality of transmission antennas and a plurality of reception antennas;
    projection direction/imaging policy control processing of holding an imaging policy including a projection direction representing a direction in which an inspection target is viewed, an imaging area indicating an area of which a three-dimensional radar image is to be generated, and set information being information on a set of pairs of a transmission antenna and a reception antenna for use in generation of the three-dimensional radar image;
    imaging processing of generating the three-dimensional radar image from the radar signal in accordance with the imaging policy; and
    projection processing of forming the generated three-dimensional radar image into a two-dimensional image by projecting the generated three-dimensional radar image in the projection direction indicated by the imaging policy.
13. The imaging method according to supplementary note 12, in which
    the imaging policy includes an algorithm for generating the three-dimensional radar image from the radar signal, or information that specifies the algorithm, and
    in the imaging processing, the three-dimensional radar image is generated by using the algorithm.

14. The imaging method according to supplementary note 12 or 13, in which
the transmission antenna and the reception antenna are arranged within at least two panels facing each other with a passage through which an inspection target passes interposed.
15. The imaging method according to supplementary note 14, in which
the two panels are parallel to each other.
16. The imaging method according to any one of supplementary notes 12 to 15, in which
the imaging policy is set for each of a plurality of the projection directions, and
the plurality of the projection directions include a front surface, a back surface, a left side surface, and a right side surface of the inspection target.
17. The imaging method according to supplementary note 15, in which
the imaging policy is set for each of the plurality of the projection directions,
the projection direction includes four directions at an interval of 90°, and
the four directions are perpendicular or parallel to the two panels.
18. The imaging method according to any one of supplementary notes 12 to 17, in which
in the projection direction/imaging policy control processing, determination as to whether the inspection target is present within the imaging area is performed; and,
in the imaging processing, in a case where it is determined that the inspection target is present within the imaging area, generation of the three-dimensional radar image is performed.
19. The imaging method according to supplementary note 18, in which
in the projection direction/imaging policy control processing, determination as to whether the inspection target is present within the imaging area is performed, based on the radar signal.
20. The imaging method according to supplementary note 19, in which
in the projection direction/imaging policy control processing, determination as to whether the inspection target is present within the imaging area is performed by generating, from the radar signal, a radar image for presence determination in an area including the imaging area, and based on a distribution of reflection intensity of an electromagnetic wave within the temporary radar image.
21. The imaging method according to supplementary note 18, in which
in the projection direction/imaging policy control processing, determination as to whether the inspection target is present within the imaging area is performed by using a measurement result of a sensor capable of recognizing presence of the inspection target.
22. The imaging method according to supplementary note 21, in which
the sensor is a pressure sensor installed on a floor.
23. A program causing a computer to include:
a radar signal transmission/reception function of acquiring a radar signal generated by using a plurality of transmission antennas and a plurality of reception antennas;
a projection direction/imaging policy control function of holding an imaging policy including a projection direction representing a direction in which an inspection target is viewed, an imaging area indicating an area of which a three-dimensional radar image is to be generated, and set information being information on a set of pairs of a transmission antenna and a reception antenna for use in generation of the three-dimensional radar image;
an imaging function of generating the three-dimensional radar image from the radar signal in accordance with the imaging policy; and
a projection processing function of forming the generated three-dimensional radar image into a two-dimensional image by projecting the generated three-dimensional radar image in the projection direction indicated by the imaging policy.
24. The program according to supplementary note 23, in which
the imaging policy includes an algorithm for generating the three-dimensional radar image from the radar signal, or information that specifies the algorithm, and
the imaging function generates the three-dimensional radar image by using the algorithm.
25. The program according to supplementary note 23 or 24, in which
the transmission antenna and the reception antenna are arranged within at least two panels facing each other with a passage through which an inspection target passes interposed.
26. The program according to supplementary note 25, in which
the two panels are parallel to each other.
27. The program according to any one of supplementary notes 23 to 26, in which
the imaging policy is set for each of a plurality of the projection directions, and
the plurality of the projection directions include a front surface, a back surface, a left side surface, and a right side surface of the inspection target.
28. The program according to supplementary note 26, in which
the imaging policy is set for each of a plurality of the projection directions,
the projection direction includes four directions at an interval of 90°, and
the four directions are perpendicular or parallel to the two panels.
29. The program according to any one of supplementary notes 23 to 28, in which
the projection direction/imaging policy control function performs determination as to whether the inspection target is present within the imaging area, and,
in a case where it is determined that the inspection target is present within the imaging area, the imaging function performs generation of the three-dimensional radar image.
30. The program according to supplementary note 29, in which
the projection direction/imaging policy control function performs determination as to whether the inspection target is present within the imaging area, based on the radar signal.
31. The program according to supplementary note 30, in which
The projection direction/imaging policy control function performs determination as to whether the inspection target is present within the imaging area by generating, from the radar signal, a radar image for presence determination in an area including the imaging area, and based on a distribution of reflection intensity of an electromagnetic wave within the temporary radar image.

32. The program according to supplementary note 29, in which
the projection direction/imaging policy control function performs determination as to whether the inspection target is present within the imaging area by using a measurement result of a sensor capable of recognizing presence of the inspection target.

33. The program according to supplementary note 32, in which
the sensor is a pressure sensor installed on a floor.

REFERENCE SIGNS LIST 100, 200, 300, 800 Radar apparatus
101, 801 Transmission antenna (Tx)
102, 802 Reception antenna (Rx)
103, 803 Radar signal transmission/reception unit
104, 204, 804 Imaging unit
805 Projection direction control unit
106, 806 Projection processing unit
107, 207, 307 Projection direction/imaging policy control unit
308 External sensor

What is claimed is:

1. A radar apparatus comprising:
at least one memory configured to store instructions; and
at least one processor configured to execute the instructions to perform operations, the operations comprising:
acquiring a radar signal generated by using a plurality of transmission antennas and a plurality of reception antennas;
holding an imaging policy including a projection direction representing a direction in which an inspection target is viewed, an imaging area indicating an area of which a three-dimensional radar image is to be generated, and set information being information on a set of pairs of a transmission antenna and a reception antenna for use in generation of the three-dimensional radar image;
generating the three-dimensional radar image from the radar signal in accordance with the imaging policy; and
forming the generated three-dimensional radar image into a two-dimensional image by projecting the generated three-dimensional radar image in the projection direction indicated by the imaging policy.

2. The radar apparatus according to claim 1, wherein
the imaging policy includes an algorithm for generating the three-dimensional radar image from the radar signal, or information that specifies the algorithm, and
the operations comprise generating the three-dimensional radar image by using the algorithm.

3. The radar apparatus according to claim 1, wherein
the transmission antenna and the reception antenna are arranged within at least two panels facing each other with a passage through which an inspection target passes interposed.

4. The radar apparatus according to claim 3, wherein
the two panels are parallel to each other.

5. The radar apparatus according to claim 1, wherein
the imaging policy is set for each of a plurality of the projection directions, and the plurality of the projection directions include a front surface, a back surface, a left side surface, and a right side surface of the inspection target.

6. The radar apparatus according to claim 4, wherein
the imaging policy is set for each of a plurality of the projection directions,
the projection direction includes four directions at an interval of 90°, and
the four directions are perpendicular or parallel to the two panels.

7. The radar apparatus according to claim 1, wherein the operations comprise
performing determination as to whether the inspection target is present within the imaging area, and,
in a case where it is determined that the inspection target is present within the imaging area, performing generation of the three-dimensional radar image.

8. The radar apparatus according to claim 7, wherein the operations comprise
performing determination as to whether the inspection target is present within the imaging area, based on the radar signal.

9. An imaging method comprising,
by a computer:
radar signal transmission/reception processing of acquiring a radar signal generated by using a plurality of transmission antennas and a plurality of reception antennas;
projection direction/imaging policy control processing of holding an imaging policy including a projection direction representing a direction in which an inspection target is viewed, an imaging area indicating an area of which a three-dimensional radar image is to be generated, and set information being information on a set of pairs of a transmission antenna and a reception antenna for use in generation of the three-dimensional radar image;
imaging processing of generating the three-dimensional radar image from the radar signal in accordance with the imaging policy; and
projection processing of forming the generated three-dimensional radar image into a two-dimensional image by projecting the generated three-dimensional radar image in the projection direction indicated by the imaging policy.

10. A non-transitory computer-readable medium storing a program for causing a computer to include-perform operations, the operations comprising:
acquiring a radar signal generated by using a plurality of transmission antennas and a plurality of reception antennas;
holding an imaging policy including a projection direction representing a direction in which an inspection target is viewed, an imaging area indicating an area of which a three-dimensional radar image is to be generated, and set information being information on a set of pairs of a transmission antenna and a reception antenna for use in generation of the three-dimensional radar image;
generating the three-dimensional radar image from the radar signal in accordance with the imaging policy; and
forming the generated three-dimensional radar image into a two-dimensional image by projecting the generated three-dimensional radar image in the projection direction indicated by the imaging policy.

* * * * *